United States Patent
Schöb

[11] Patent Number: 5,939,813
[45] Date of Patent: Aug. 17, 1999

[54] GAP TUBE MOTOR

[75] Inventor: Reto Schöb, Volketswil, Switzerland

[73] Assignees: Sulzer Electronics AG, Winterthur, Switzerland; Lust Antriebstechnik GmbH, Lahnau, Germany

[21] Appl. No.: 09/029,123

[22] PCT Filed: Aug. 26, 1996

[86] PCT No.: PCT/CH96/00294

§ 371 Date: Feb. 23, 1998

§ 102(e) Date: Feb. 23, 1998

[87] PCT Pub. No.: WO97/08808

PCT Pub. Date: Mar. 6, 1997

[30] Foreign Application Priority Data

Aug. 24, 1995 [CH] Switzerland .................... 2422/95

[51] Int. Cl.$^6$ .................................................. H02K 1/12
[52] U.S. Cl. .................... 310/254; 310/87; 310/90; 310/90.5; 310/156; 310/261; 310/266; 310/267
[58] Field of Search ........................ 310/87, 90.5, 156, 310/254, 261; 417/356, 104, 107, 368

[56] References Cited

U.S. PATENT DOCUMENTS

| | | | |
|---|---|---|---|
| 3,572,982 | 3/1971 | Kozdon ............................... | 417/423 |
| 4,779,614 | 10/1988 | Moise .................................. | 600/16 |
| 4,908,012 | 3/1990 | Moise et al. ........................ | 600/16 |
| 4,988,906 | 1/1991 | Littlefield .......................... | 310/90.5 |
| 5,059,092 | 10/1991 | Kabelitz et al. ................... | 415/90 |
| 5,127,792 | 7/1992 | Katsuta et al. .................... | 415/104 |
| 5,288,213 | 2/1994 | Nasr .................................... | 417/368 |
| 5,308,229 | 5/1994 | Dupuis et al. ..................... | 417/368 |
| 5,494,413 | 2/1996 | Campen et al. .................... | 417/356 |
| 5,567,132 | 10/1996 | Dupuis et al. ..................... | 417/420 |

FOREIGN PATENT DOCUMENTS

| | | | |
|---|---|---|---|
| 9210314 | 3/1993 | France ............................. | 310/90.5 |
| 4111466A1 | 10/1992 | Germany ........................ | 310/90.5 |
| WO 88/07842 | 10/1988 | WIPO ............................. | 310/90.5 |

OTHER PUBLICATIONS

Chiba, et al., "An Analysis of Bearingless AC Motors" in: *IEEE Transactions on Energy Conversion*, vol. 9, No. 1, 1994, New York, US, pp. 61–68.

Patent Abstracts of Japan, vol. 18, No. 355 (E–1573), Jul. 5, 1994 & JP,A,06 090545 (Ebara Corporation), Mar. 29, 1994. Abstract.

*Primary Examiner*—Elvin G. Enad
*Attorney, Agent, or Firm*—Townsend and Townsend and Crew LLP

[57] ABSTRACT

The gap tube motor comprises a rotor, a stator and a gap tube which is arranged between the rotor and the stator, with at least two bearing apparatuses being arranged with a spacing in the axial direction (A) with respect to the rotor, and with at least one of the bearing apparatuses being designed as a bearing and drive apparatus and comprising both an electrical motor drive apparatus and a magnetic bearing apparatus in order to both drive the rotor and to journal the rotor in the radial direction without contact using this bearing and drive apparatus.

9 Claims, 9 Drawing Sheets

GAP TUBE MOTOR

BACKGROUND OF THE INVENTION

1. Field of the Invention

The invention relates to a gap tube motor including a gap tube arranged between a rotor and stator.

2. Description of the Prior Art

In pumps, for example, for aggressive liquids or for water of highest purity, a complete separation between the drive motor and the pump is required. It is known to use a gap tube motor or canned motor, which has a gap tube arranged between the stator and the rotor, for applications of this kind. It is known to suspend the rotor of a gap tube motor hydrostatically or by means of a sliding bearing. A gap tube motor having a sliding bearing has, for example, the disadvantage that abrasive substances contained in the liquid can already destroy the sliding bearing after a short operating period. In addition, the liquid can be contaminated by the particles of the sliding bearing. A gap tube motor having a hydrostatic bearing has, for example, poor dry running properties. Moreover, liquids with volatile substances, i.e. liquids with gas components, can be forwarded only poorly.

SUMMARY OF THE INVENTION

The object of the present invention is to provide an economically more advantageous gap tube motor.

This object is satisfied by a gap tube motor in accordance with the features of claim 1. The subordinate claims 2 to 8 relate to further advantageous embodiments of the invention.

The object is satisfied, in particular, in that the gap tube motor comprises a rotor, a stator and a gap tube which is arranged between the rotor and the stator; in that at least two bearing apparatuses are arranged at a spacing in an axial direction with respect to the rotor; and in that at least one of the bearing apparatuses is formed as a bearing and drive apparatus and comprises both an electric motor drive apparatus and a magnetic bearing apparatus in order to both drive the rotor and to journal it in the radial direction without contact using this bearing and drive apparatus.

In an advantageous embodiment of the gap tube motor, the latter is connected to a forwarding apparatus for a fluid, in particular to a centrifugal pump. In a further advantageous embodiment, the rotor of the gap tube motor is magnetically journalled without contact by at least two magnetic bearing apparatuses which are arranged with a spacing in the axial direction. In a further advantageous embodiment, the one magnetic bearing apparatus of the gap tube motor is designed as a bearing and drive apparatus comprising an electric motor drive apparatus and a magnetic bearing apparatus. In a particularly advantageous embodiment, the bearing and drive apparatus of the gap tube motor is designed as a bearing-less motor with a motor winding which is arranged in the stator and a control winding which is arranged in the stator, with the motor winding having a number of pole pairs p and the control winding having a number of pole pairs p±1.

An advantage of the gap tube motor in accordance with the invention is to be seen in the fact that the rotor can be designed with purely passively operating components and in that the coils which magnetically journal or magnetically drive the rotor are arranged so that they are separated from the rotor by a gap tube. The rotor is thereby magnetically journalled without contact and the space surrounding the rotor is hermetically separated by the gap tube with respect to the stator. In this way a gap tube pump can be manufactured having a rotor which is journalled without contact and in which the space surrounding the rotor is hermetically separated from the stator by the gap tube. Through this hermetic separation, the gap tube pump in accordance with the invention is suitable, in particular, for the forwarding of substances of high purity such as water or enzymes of biochemical processes. Abrasive substances containing chemicals can also be forwarded using the gap tube pump in accordance with the invention, since the rotor is journalled without contact and thus the abrasive substances can not damage the bearing apparatus. The gap tube pump in accordance with the invention has excellent dry running properties since the rotor is magnetically journalled without contact even in the absence of a fluid or in the presence of strongly gassing or highly volatile fluids.

The invention will be explained with reference to a plurality of exemplary embodiments. Shown are:

DESCRIPTION OF PREFERRED EXEMPLARY EMBODIMENTS

Figure 2:
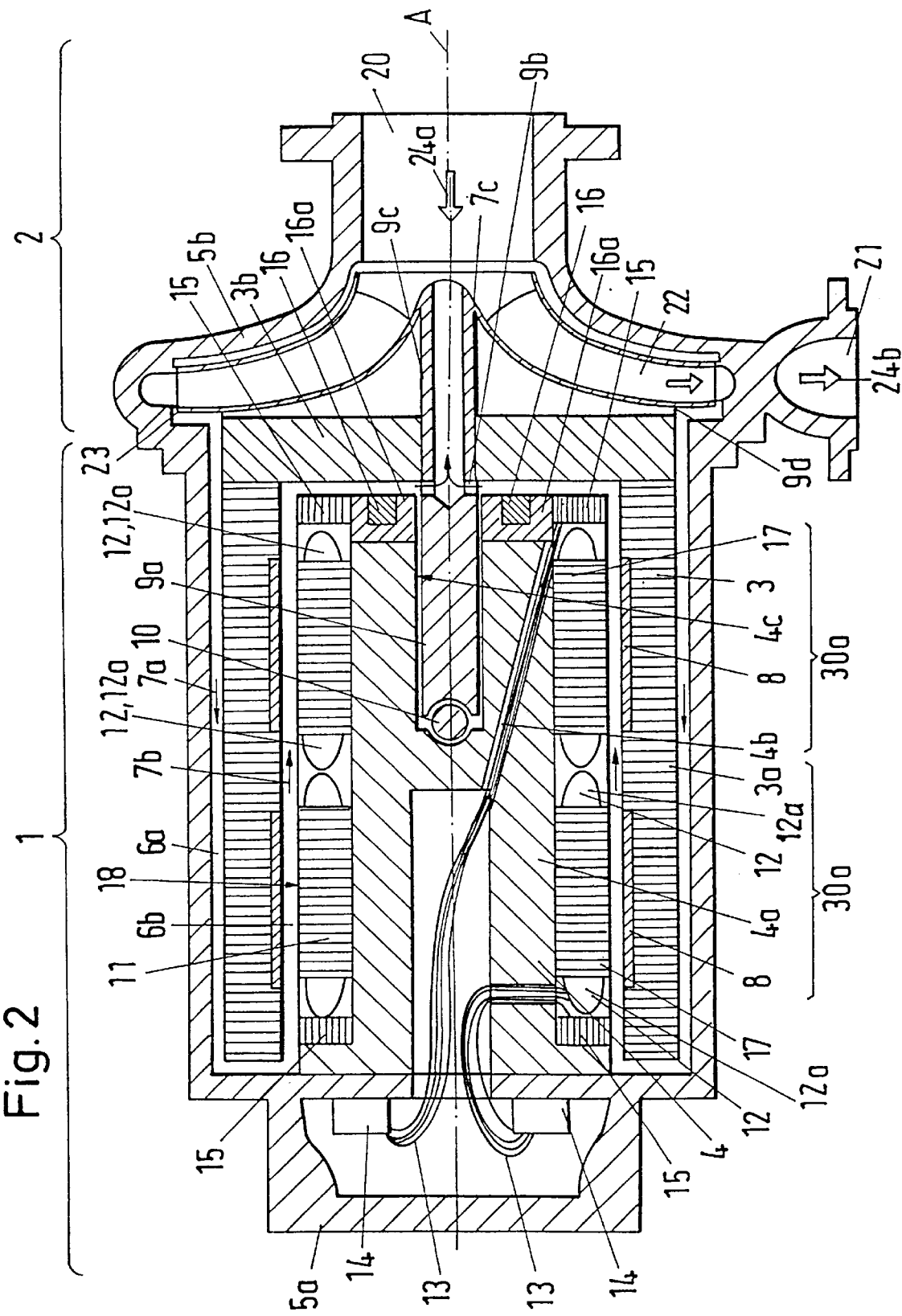
FIG. 2 is a longitudinal section through an exemplary embodiment of a gap tube motor with a centrifugal pump.

FIG. 2 shows a gap tube motor 1 which is designed with an outer rotor 3 and is connected to a centrifugal pump 2 via a shaft 9c. The centrifugal pump 2 sucks in a fluid flowing in the direction 24a via the inlet opening 20 and forwards it by means of a rotating impeller or rotor wheel 22 flowing in the direction 24a to the outlet 21. The gap tube motor 1 and the centrifugal pump 2 have a common axis of rotation A. The stator 4 of the gap tube motor 1 is arranged to lie inwardly and has a core 4a of a magnetically conducting material, in particular of iron, at the surface of which iron lamina of sheet iron 11 are arranged, which extend in the radial direction and into which electrical conductors 12 are embedded in the manner which is usual in electric motors. All iron lamina 11 together form a laminated stator pack. The electrical conductors 12 are arranged in such a manner that an electromagnetic rotary field can be produced in order to set the outwardly disposed rotor 3 in rotation. The stator 4 has a cylindrical cut-out 4c the reception of a track bearing 10. The centrifugal pump 2 produces a force which acts in the flow direction 24a during operation and which is transmitted via the shaft 9c, 9a and the track bearing 10 to the stator 4. The stator 4 is surrounded by a hollow cylindrical rotor 3 which is designed as an external rotor and which is designed as an outer rotor and which has permanent magnets 8 arranged on the axially extending inner surface near the stator 4. The rotor 3 can also be designed in such a manner that an induction or a reluctance motor results together with the stator 4. At the end near the centrifugal pump 2, the hollow cylindrical rotor 3 has a disc-shaped terminal part 3b which is connected to the shaft 9c in order to drive the impeller 22. The rotor 3 can, in addition, have a hollow cylindrical connection 9d which connects the disc-shaped terminal part 3b to the centrifugal pump 2, with the connection part 9d having a diameter corresponding to the outer diameter of the rotor 3 in the exemplary embodiment illustrated in FIG. 2.

The gap tube motor 1 and the centrifugal pump 2 are surrounded by a common pressure-resistant housing 5. The gap tube motor 1 has a gap tube 18 in which at least the surface of the stator 4 or the lamella 11 facing the rotor 3 is or are surrounded by a means 18 which is impermeable to fluid or liquid or is or are surrounded by a gap tube 18 respectively. This gap tube 18 can consist, in particular, of a metal, of a metal alloy such as Hastelloy C22, or of a plastic, in particular, of a corrosion resistant material.

The gap tube motor pump 1, 2 formed in this manner has an opening 23 for a liquid passage so that the liquid first flows in the axial direction 7a between the rotor 3 and the housing 5 starting from the high pressure part of the pump 2, then flows back in the opposite, axial direction 7b between the rotor 3 and the stator 4 and in so doing forms a hydrodynamic radial bearing for the rotor 3. The liquid flows further towards the axis of rotation A, passing in a radial direction to the axis of rotation A between the stator 4 and the disc 3b, whereupon a hydrodynamic axial bearing for the rotor 3 forms between the end faces of the stator 4 and the oppositely disposed surface of the disc 3b. The liquid flows via an opening 9b into the shaft 9c and further through the hollow shaft 9c to the inlet 20 of the centrifugal pump 2. The shaft 9c has an extension part 9a which is journalled in the cylindrical cut-out 4c of the stator 4 by a track bearing 10. The track bearing 10 is required, in particular, for starting up the centrifugal pump 2, whereas during the forwarding operation the hydrodynamic axial bearing formed between the stator 4 and the disc 3b suffices in order to compensate the forces acting in the axial direction.

The disc-shaped terminal part 3b can also be connected to the shaft 9a, 9c without an aperture 9b. The gaps 6a, 6b are thereby filled with liquid, but a flow direction 7a, 7b arises, however, in the axial direction A. Thus, the rotor 3 has a hydrodynamic bearing acting, in particular, in the radial direction.

The rotor 3 can be equipped as illustrated with permanent magnets 8 or can be designed as a cage rotor or a reluctance rotor.

A stator 4 can have cavities, such as, for example, at the electrical conductors 12, in the end region of the stator 4. Cavities of this kind can be filled with a filler such as a casting resin or with an oil so that the liquid impermeable layer also lies on the filler.

An advantage of the gap tube motor 1 in accordance with the invention is to be seen in the fact that the layer 18 which is impermeable to liquid is arranged on the surface of the cylindrically designed stator 4. Since this layer 18 is subjected exclusively to a pressure loading, it can be made very thin and/or consist of an elastic material such as a plastic. A further advantage of the gap tube motor 1 is to be seen in the fact that the liquid flowing in the gap 6a, 6b, 6c can have a very high pressure without damaging the layer 18 which is impermeable to liquid. A further advantage of the gap tube motor 1 is to be seen in the fact that the core 4a of the stator 4 can also be manufactured of a ceramic, so that the stator 4 has a high pressure resistance and the track bearing 10 has advantageous bearing properties.

The gap tube motor 1 has two bearing apparatuses 30a which are arranged spaced apart in the direction of the axis A and are both designed as a so-called bearing-free motor. A bearing-free motor of this kind produces a torque on the rotor 3 in the drive direction as well as a force on the rotor 3 in the radial direction in order to journal the rotor 3 without contact. The stator 4 of a bearing-free motor of this kind has a winding 12 with a number of pole pairs p for the production of the torque, and an additional control winding 12a for the contact-free journalling of the rotor 3, with the control winding 12a having a number of pole pairs p±1. Further sensors 15 with an integrated position sensor are arranged in the stator 4 in order to measure the position of the rotor 3 relative to the stator 4 and to pass it on to a control or regulating apparatus 40. The stator 4 has passages 4b for the reception of electrical conductors 13 which are led to the windings 12, 12a and to the sensors 15 starting from a distributor device 14. The signals of the sensors 15 are received by a measuring apparatus 45 and fed to a control apparatus 40 which correspondingly excites the windings 12 and the control windings 12, 12a via a setting apparatus or controller 41, 42, 43, 44 and the distributor devices 14 which are placed after it.

An electronic control system 40 receives the values of the sensors 15 and excites the control windings 12, 12a in such a manner that the position of the rotor 3 is controlled in the radial and/or axial direction in such a manner that the rotor 3 as well as the centrifugal pump 2 with the wheel 22 which is connected to it is magnetically journalled and can rotate freely. This kind of magnetic bearing is advantageous, for example, for the starting up and running down of the centrifugal pump 2 because the liquid has a relatively low pressure in these operating states so that the liquid 7a, 7b flowing in the gap tube 6a, 6b does not ensure that the rotor 3 and the stator 4 do not come into mutual contact. The actively regulated magnetic bearing prevents a mutual contact between the rotor 3 and the stator 4, in particular, during a standstill of the motor, with an emergency running bearing 10 or a track bearing 10 being provided in the case of larger arising forces in order to transmit the forces acting to the stator 4. It can prove advantageous to arrange an active axial magnetic bearing at the stator 4. FIG. 2 shows an active magnet at the end face of the cylindrical stator 4, the active magnet being designed in the form of a ring and having a ring winding 16 which is arranged in a terminal part 16a of good magnetic conductivity. This active magnet with the ring winding 16 enables the rotor 3 to be drawn towards the stator 4. During this, the liquid located between the disc-shaped terminal part 16a of the stator 4 and the disc-shaped termination of the rotor 3 produces a hydrodynamic bearing with a force acting in the direction towards the centrifugal pump 22. The active magnet with the ring winding 16 produces a force opposed to the former. The distance between the two terminal parts 3b, 16a is monitored by a sensor 15. This sensor signal is fed to a control apparatus 40 which excites the active magnet with the ring winding 16 in accordance with the desired values.

Figure 1:
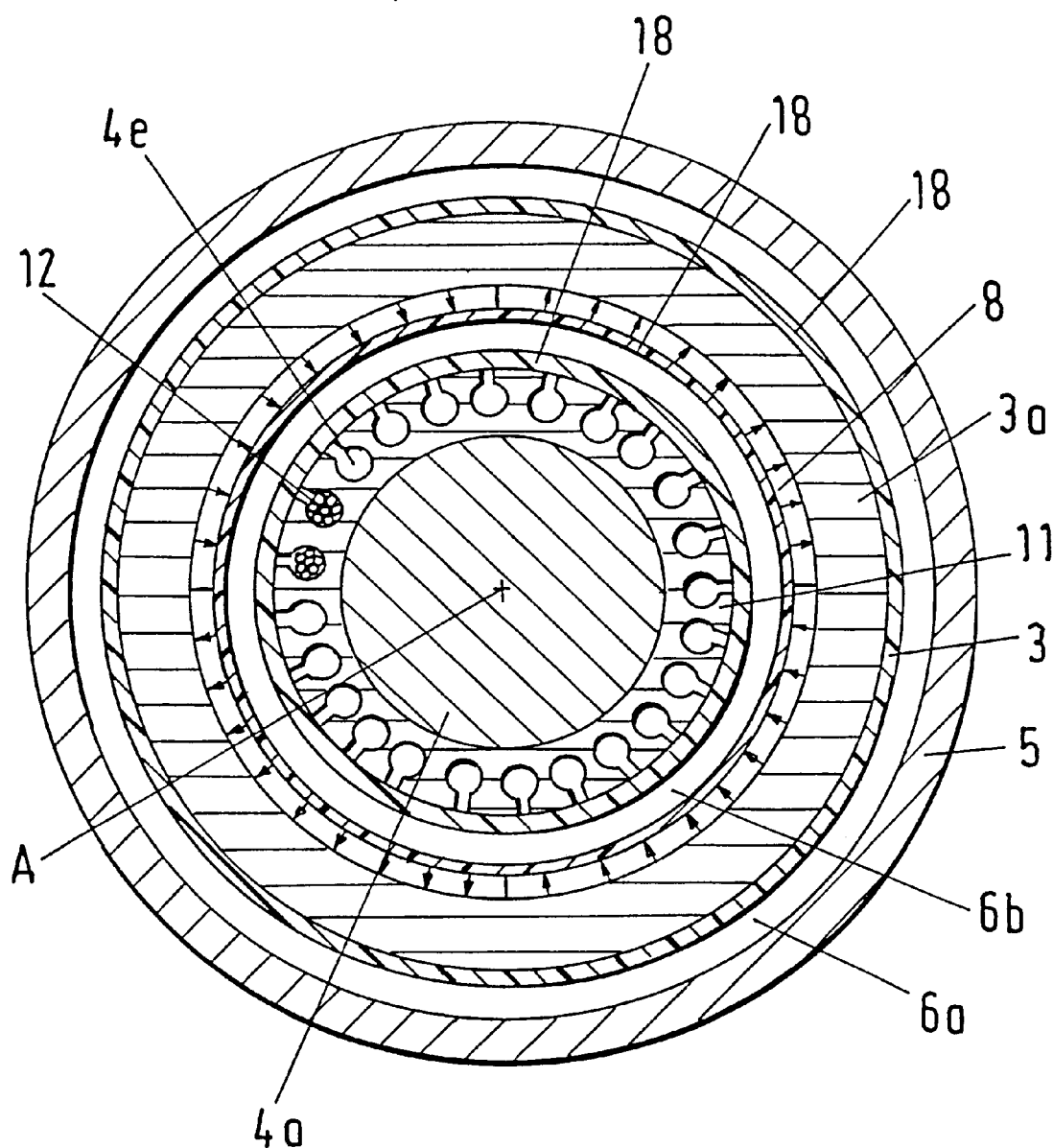
FIG. 1a is a cross-section through FIG. 3 along the line A—A.
Figure 3:
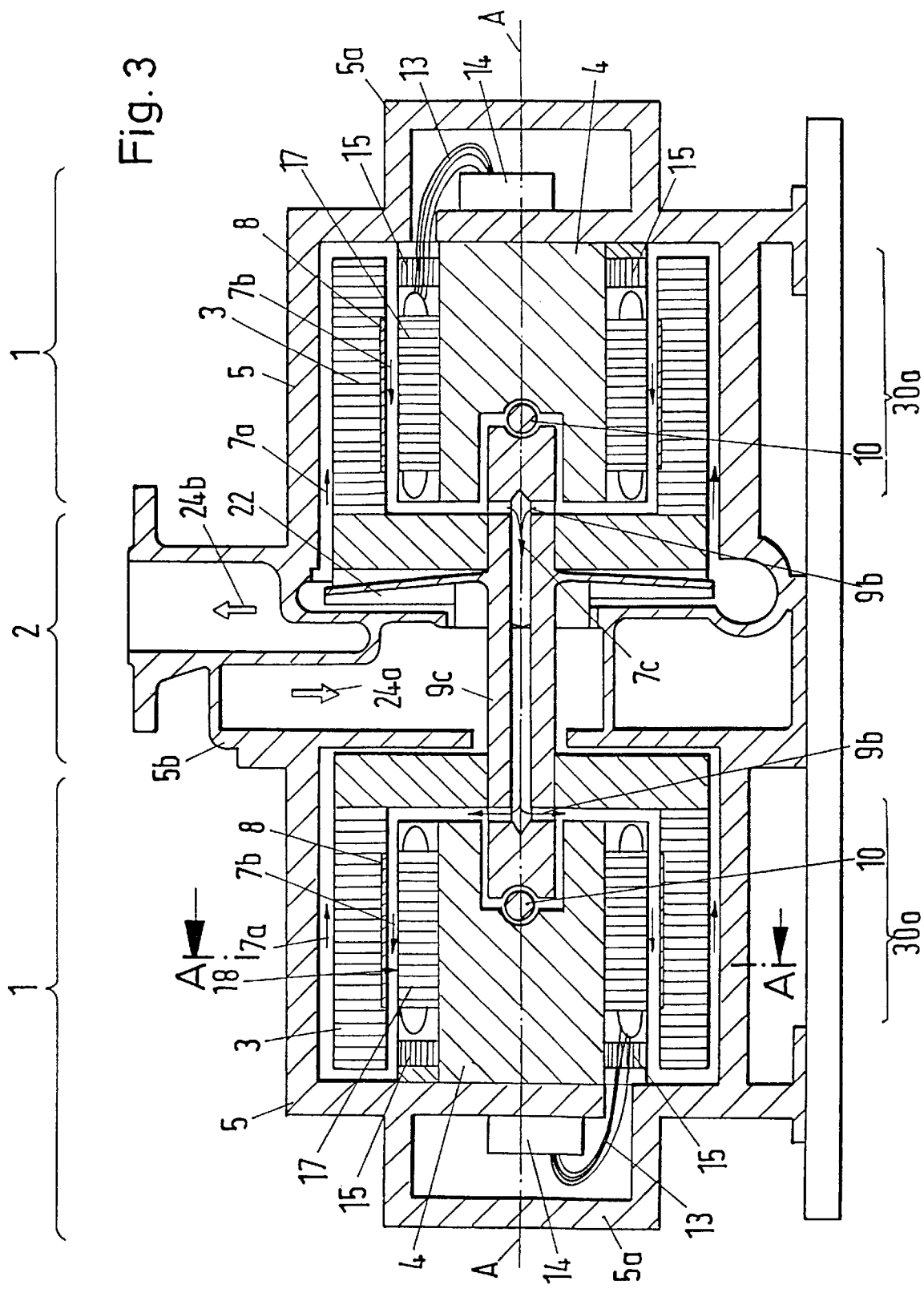
FIG. 3 is a longitudinal section through an exemplary embodiment with symmetrically arranged gap tube motors and with a centrifugal pump lying therebetween.

FIG. 1a shows a cross-section through FIG. 3 along the line A—A. The stator 4 has a plurality of cut-outs 4e or grooves 4e extending parallel to the axis A. In the cross-section of FIG. 1a the embedded electrical conductors 12 are illustrated in only a few grooves 4e in order to simplify the illustration. In the assembled motor, however, all grooves 4e have an embedded electrical conductor 12. The conductors 12 can be arranged and excited in such a manner that they can be operated with a rotary current and that a rotary magnetic field thereby arises in the stator 4. The thin layer 18 which is impermeable to fluid or liquid, which is not illustrated in FIG. 3, i.e. the gap tube 18, can be seen in FIG.

1a. Going from the outside inward, the rotor 3 first has a layer 18 which is impermeable to fluid or liquid, followed by a laminated rotor pack 3a, a layer of permanent magnets 8 polarized in the radial direction and finally a layer 18 which is impermeable to fluid or liquid lying on the permanent magnets 8. For the permanent magnets 8, the direction of the magnetization is indicated with arrows, with the magnetization extending in the radial direction and with individual permanent magnets 8 being adjacently arranged in the peripheral direction in such a manner that regions with magnetization pointing radially outwardly and regions with magnetization pointing radially inwardly arise. The laminated stator pack 11 and the grooves 4e are covered over towards the gap 6b with a layer 18 which is impermeable to fluid or liquid so that the entire stator is protected against a liquid present in the gap 6b.

FIG. 3 shows a longitudinal section of a gap tube motor 1 with two symmetrically arranged stators 4 and two rotors 3 connected via a common shaft 9c. The centrifugal pump 2 is fastened to the common shaft 9c. The centrifugal pump 2 and the gap tube motors 1 are arranged in common in a pressure resistant housing 5, 5a, 5b. A layer 18 which is impermeable to liquid is again arranged at the surface of the stator 4. Starting from the pressure side 24b, the gap flow flows between the housing 5 and the rotor 3 passing in the axial direction 7a, flows further in the opposite direction 7b between the rotor 3 and the stator 4, and opens into the shaft 9c via an aperture 9b. It then flows through the shaft 9c at its center passing in the axial direction, exits again at the motor 1 which is arranged at the left via the opening 9b flowing between the rotor 3 and the stator 4, and subsequently flows between the housing 5 and the rotor 3 to the suction side 24a of the centrifugal pump 2. A hydrodynamic bearing is thereby achieved. In the exemplary embodiment of FIG. 3, the two electric motors 1 are designed as bearingless motors, as described in FIG. 2. An advantage of the embodiment of FIG. 3 is to be seen in that the symmetric arrangement of the motors 1 produces smaller bearing forces, in that the lever arm between the centrifugal pump 2 and the motor 1 turns out to be shorter, and in that it is thereby possible to operate a pump having a plurality of pressure stages between the motors 1 in a simple manner.

Figure 4:
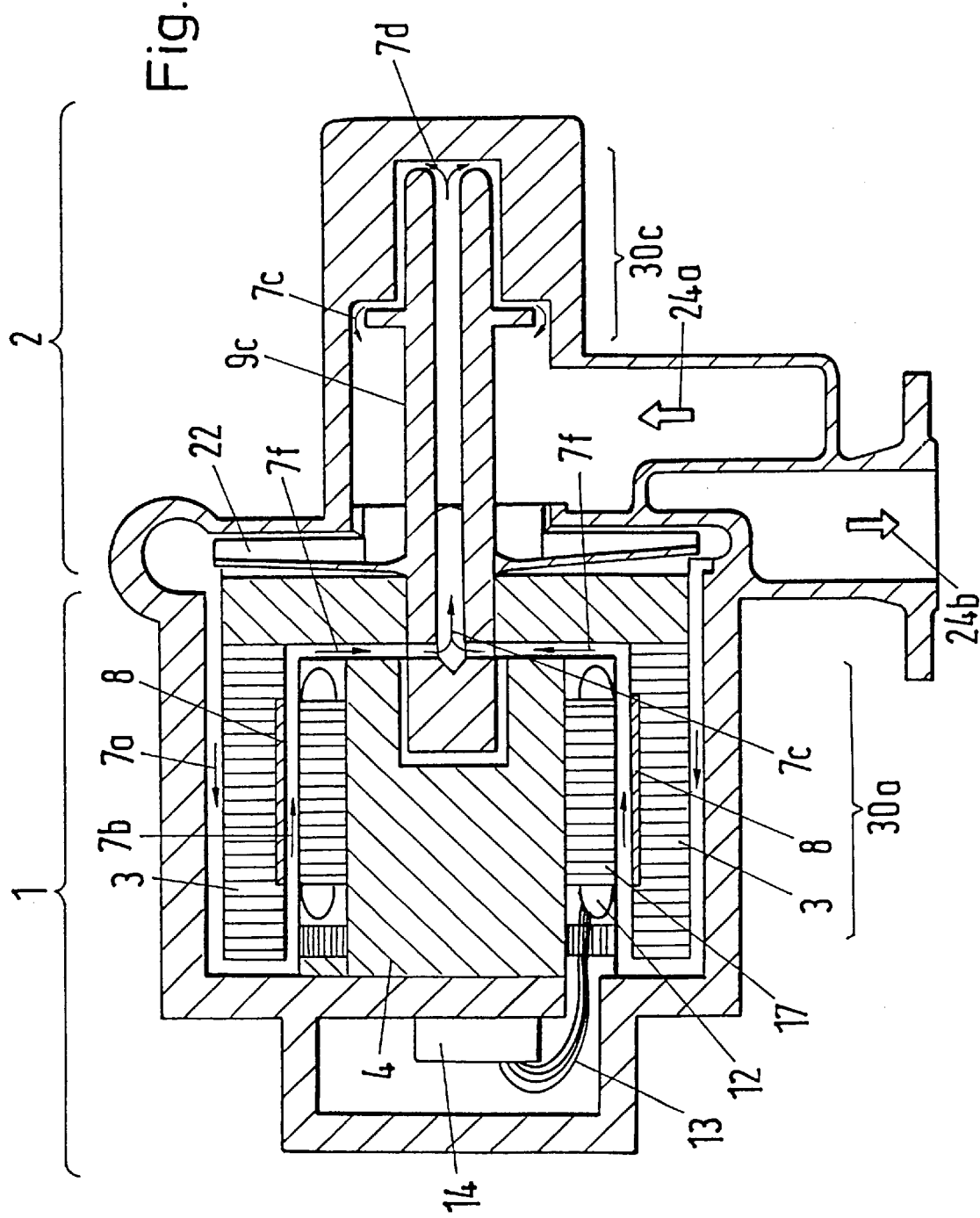
FIGS. 4, 5, 6, 7 show a longitudinal section through a further exemplary embodiment of a gap tube motor with a centrifugal pump.

FIG. 4 shows a further exemplary embodiment of a centrifugal pump 2 driven by a gap tube motor 1. This gap tube motor 1 again has an inwardly lying stator 4 and an outwardly lying rotor 3. The gap tube motor 1 again has a radial bearing formed by the fluid flows 7a, 7b and a hydrodynamic axial bearing produced by the fluid flows 7f flowing in the radial direction, with the fluid flowing in a cut-out arranged in the centre of the shaft 9c in the axial direction to the right into a hydraulic bearing apparatus 30c. The fluid flows back to the suction side 24a of the centrifugal pump 2 in the direction 7d and 7e. The hydraulic bearing apparatus 30c which is arranged on the right side likewise produces a journalling of the shaft 9c in the radial and in the axial direction. In the exemplary embodiment of FIG. 4, the bearing and drive apparatus 30a is again designed as a bearing-free motor.

Figure 5:
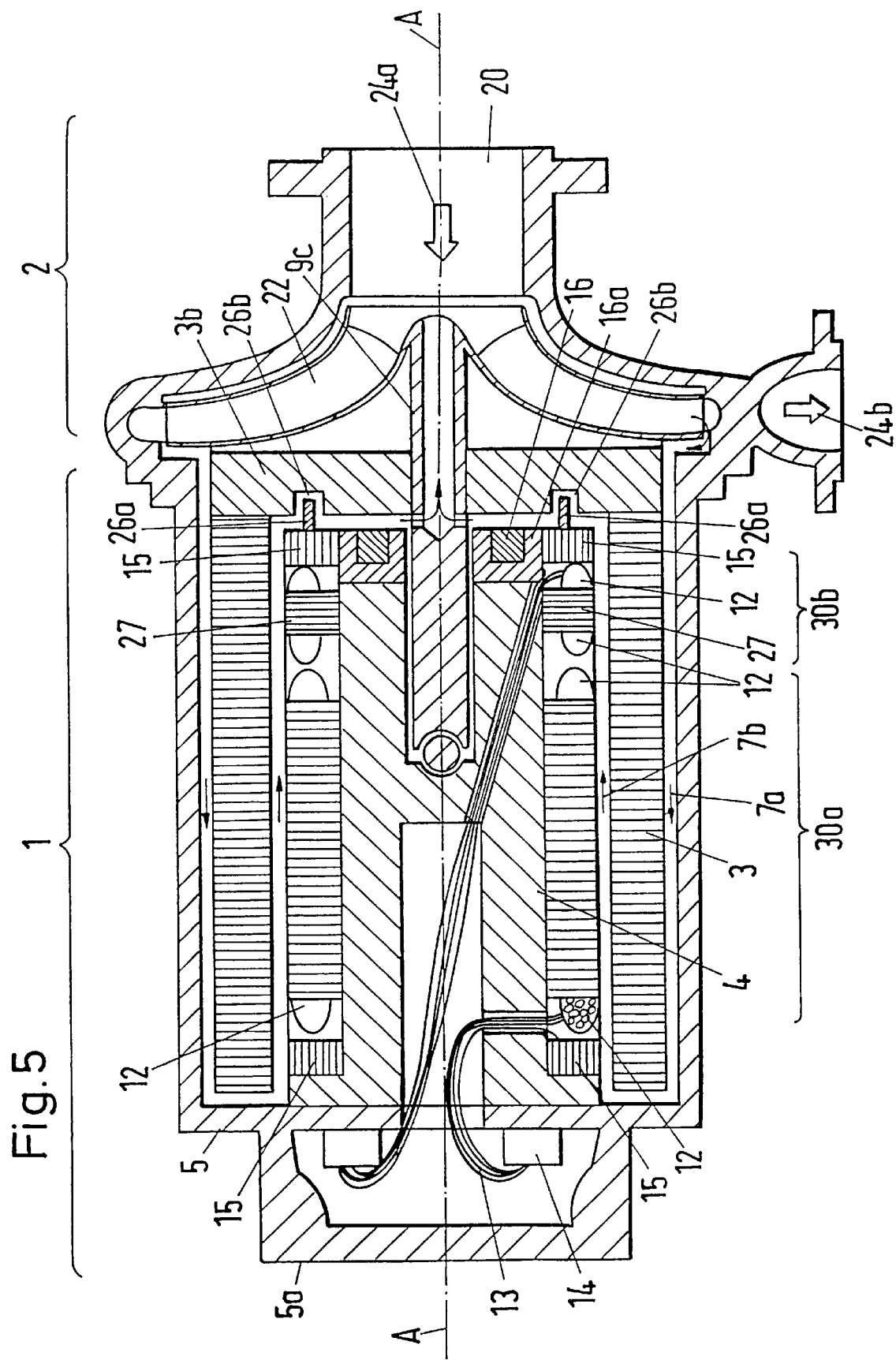

FIG. 5 shows a further exemplary embodiment of a gap tube motor 1 which has an outwardly lying rotor 3. The stator 4 has a bearing and drive apparatus 30a on the left side which is designed as a bearing-free motor and a bearing apparatus 30b on the right side designed as an actively regulated radial magnetic bearing 27. In addition, the stator has an actively regulated axial magnetic bearing 16, 16a. The sensors 15 monitor the position of the rotor 3 relative to the stator 4. The disc-shaped termination 3b of the rotor 3 has a ring-shaped cut-out 26b. The stator 4 has a ring-shaped projecting part 26a disposed opposite to this cut-out 26b. The two components 26a, 26b together form a passive means 26a, 26b for the regulation of the hydrodynamic bearing. The passive means 26a, 26b serve for the compensation of the position of the rotor 3 with respect to the stator 4 in the axial direction.

Figure 6:
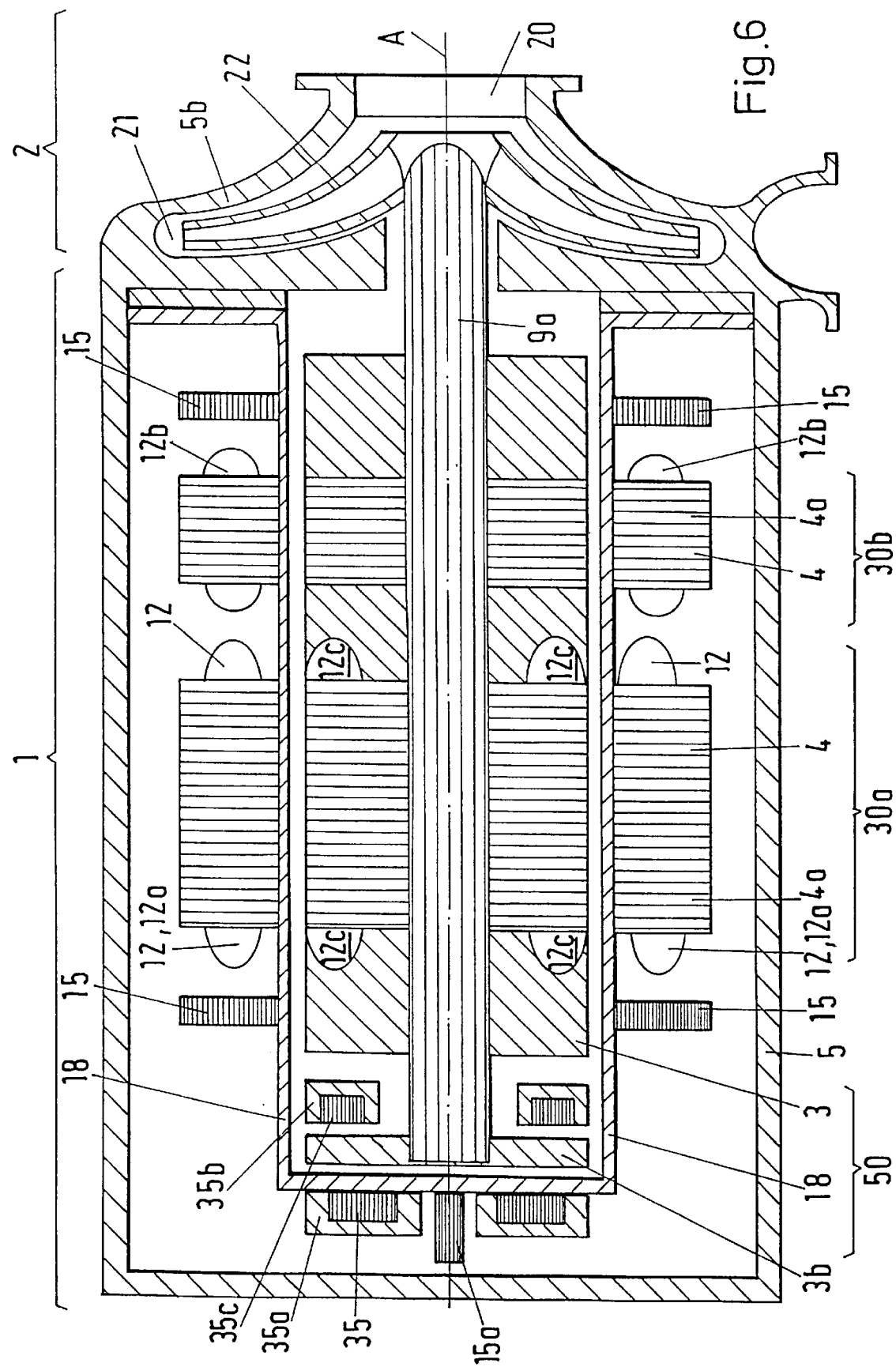

FIG. 6 shows a further exemplary embodiment of a gap tube motor 1 with an inwardly lying rotor 3 which is surrounded by a gap tube 18 and by an outwardly lying stator 4, 4a. The gap tube motor 1 has two bearing apparatuses 30a, 30b which are arranged spaced apart in the axial direction and which hold the rotor 3 without contact in the stator 4, 4a in the radial direction through magnetically acting means. The one bearing apparatus 30a is designed as a bearing-free motor, the stator 4a of which has a motor winding 12 with a number of pole pairs p and a control winding 12a with a number of pole pairs p±1. In the rotor 3 of the bearing-free motor 30a, windings 12c which extend in the axial direction are arranged in which an electric current is induced by the magnetic rotary field produced by the motor winding 12 and the control winding 12a. The winding 12c is designed as a short circuit winding. The other bearing apparatus 30b is designed as a magnetic bearing with a control winding 12b. A control winding 12b of this kind usually comprises three or four separately excitable windings in order to be able to suspend the rotor 3 without contact. This magnetic bearing 30b is advantageously arranged as near to the vaned wheel 22 as possible in order to keep the length of the part of the shaft 9a extending between the magnetic bearing 30b and the vaned wheel 22 as short as possible, so that this part of the shaft 9a forms only a short lever arm with respect to the forces produced by the vaned wheel 22 in the radial direction. The distance between the stator 4 and the rotor 3 amounts to 1 mm in the radial direction, with the gap tube 1 having a thickness of 0.6 mm and the air gap a separation of 0.4 mm. The position of the rotor 3 is monitored by sensors 15, with these sensors 15 being arranged to be separated from the rotor 3 by the gap tube 18. An eddy current sensor, an inductive sensor or a Hall sensor with a permanent magnet is suitable as a measurement principle. An axial magnetic bearing apparatus 50 is arranged at the left end of the rotor 3. The one part of the bearing apparatus 50 is arranged inside the gap tube 18 and comprises a magnetically conducting body 35b which is designed in the shape of a u and extends circularly in the peripheral direction of the rotor 3 as well as a permanent magnet 35c which is correspondingly arranged in the body 35b in order to produce a permanent magnetic force which acts on the disc 3b of the shaft 9a in the axial direction. The further part of the bearing apparatus 50 is arranged outside the gap tube 18 and comprises a circularly extending magnetically conducting body 35a which is designed in the shape of a u and has an excitable electrical coil 35 which is arranged in the u-shaped cut-out. This coil 35 can be excited by a control apparatus 41 so that the axial position of the rotor 3, which is monitored by a sensor 15a, can be influenced in a controlled manner.

Figure 7:
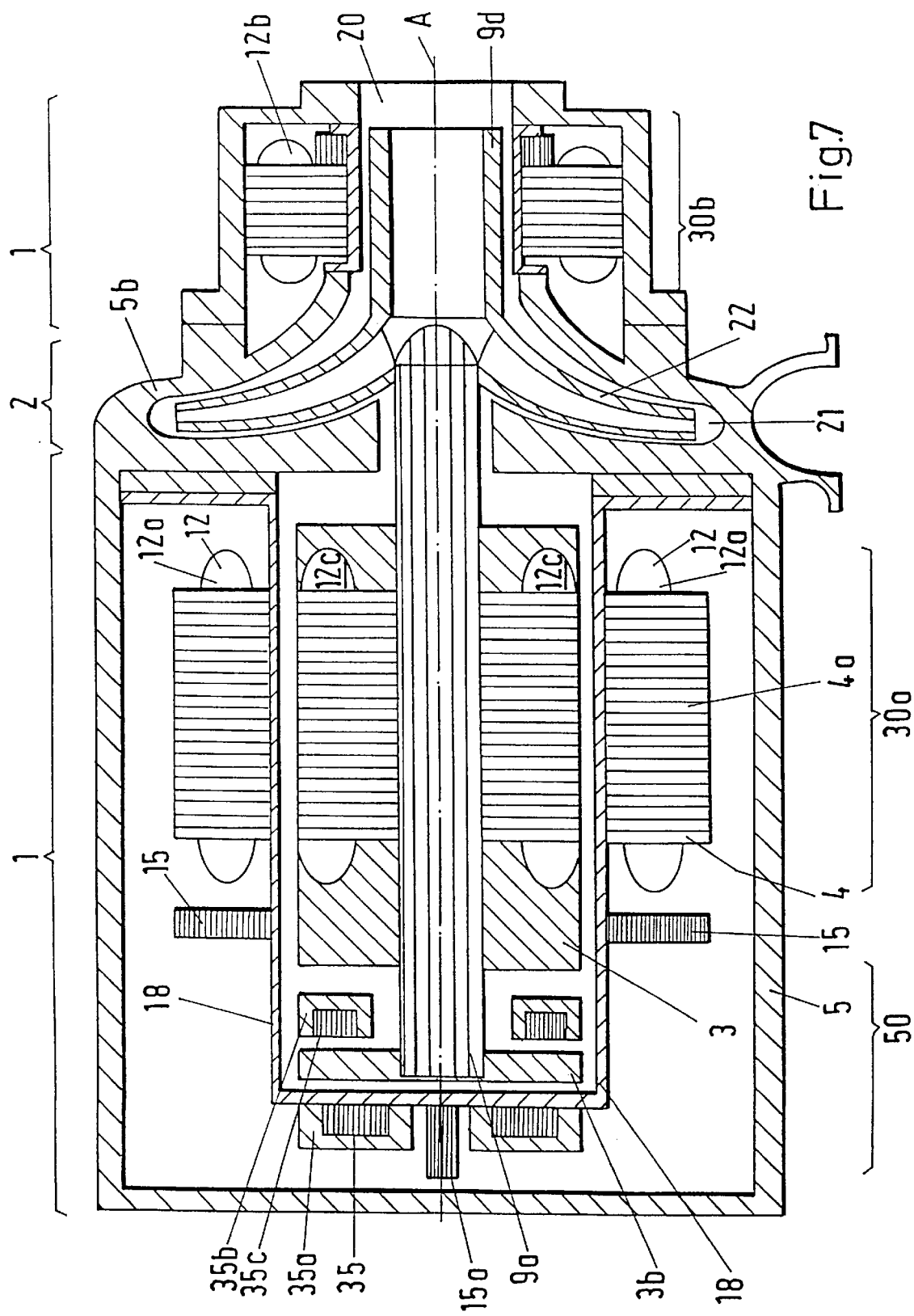

FIG. 7 shows an arrangement similar to the exemplary embodiment of FIG. 6, with the rotating wheel 22 of the centrifugal pump 2 being arranged between the bearing-free motor 30a and the magnetic bearing 30b. At the side of the inlet 20 the rotating wheel 22 has a hollow cylindrical extension 9d which is designed to be magnetically conducting and cooperates with the magnetic bearing 30b in such a manner that this extension 9d is held without contact in the radial direction by magnetically acting forces.

Figure 8:
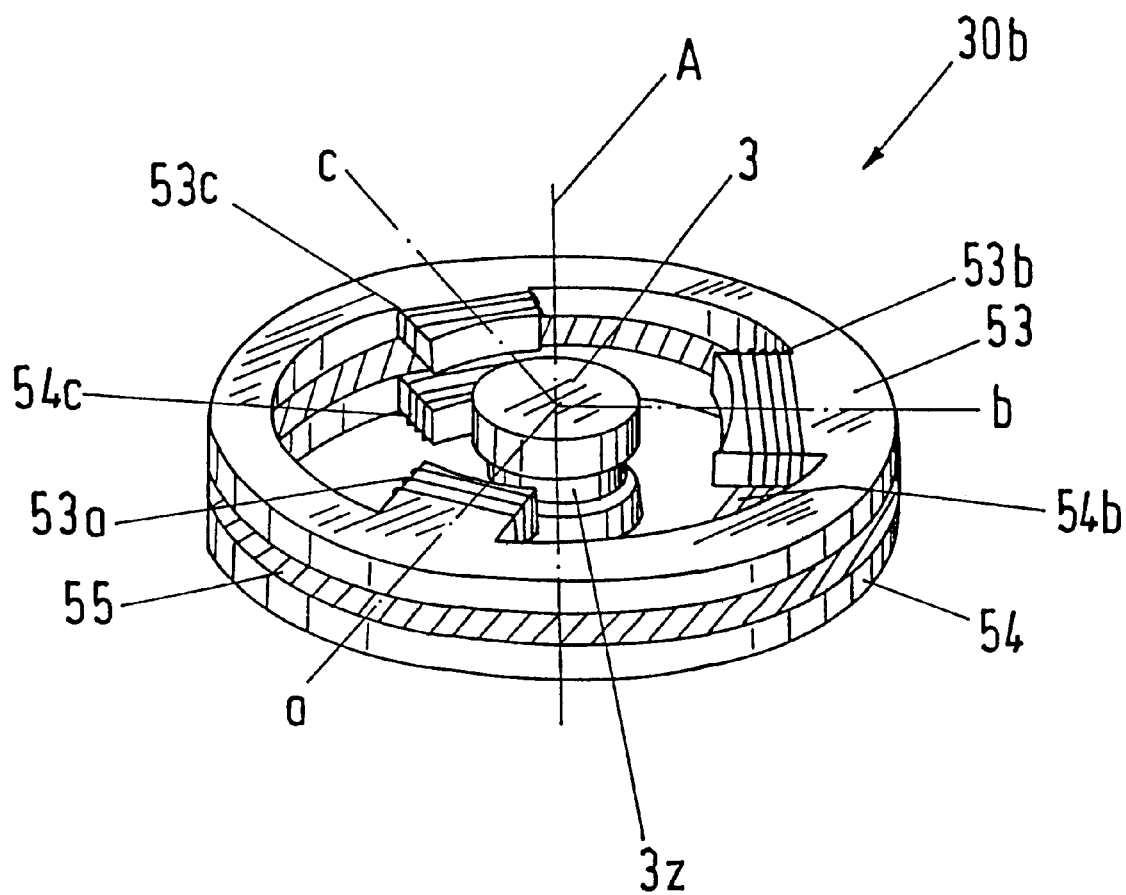
FIG. 8 is an exemplary embodiment of a magnetic radial bearing designed as a unipolar bearing.

FIG. 8 shows an exemplary embodiment of a magnetic bearing apparatus 30b which holds a rotor 3 without contact in the radial direction by means of magnetically acting forces. A magnetic bearing apparatus 30b designed in such a manner is termed a unipolar bearing and has two rotary field machine stators 53, 54 each having three discretely formed coils 53a, 53b, 53c; 54a, 54b, 54c. A permanent magnet 55 which is polarized in the axial direction is arranged between the rotary field machine stators 53, 54 and produces a unipolar flux flowing from the one rotary field machine stator 53 to the rotor 3 and from the latter back again to the rotary field machine stator 54. The coil pairs 53a, 54a; 53b, 54b; 53c, 54c are preferably connected in series and are excited by a three-phase rotary current source in such a manner that the rotor 3 is journalled in the magnetic bearing 30b without contact. In an advantageous embodiment, the rotor 3 has a groove 3z extending in the peripheral direction. This groove 3z effects a stabilizing of the rotor 3 in the axial direction, that is, produces, in the event of a deflection of the rotor 3, a magnetic force in the axial direction opposite to the deflection. A magnetic bearing 30b in accordance with embodiment illustrated in FIG. 8 can, for example, be used in a gap tube motor 1 in accordance with FIG. 6. The rotor 3 forms a part of the shaft 9a. If the magnetic bearing 30b has a groove 3z, the part of the axial bearing 50 arranged inside the gap tube 18 can be dispensed with, since a bias force acting in the axial direction can be produced through the relative arrangement of the shaft 9a and the magnetic bearing 30b in the axial direction.

Also suitable as a further embodiment of a magnetic bearing 30b, for example, is a stator with three coil bodies which are designed in the shape of a "u", which are arranged with spacing in the peripheral direction, and each of which has a controllable coil in order to magnetically journal a rotor 3 without contact.

Figure 9:
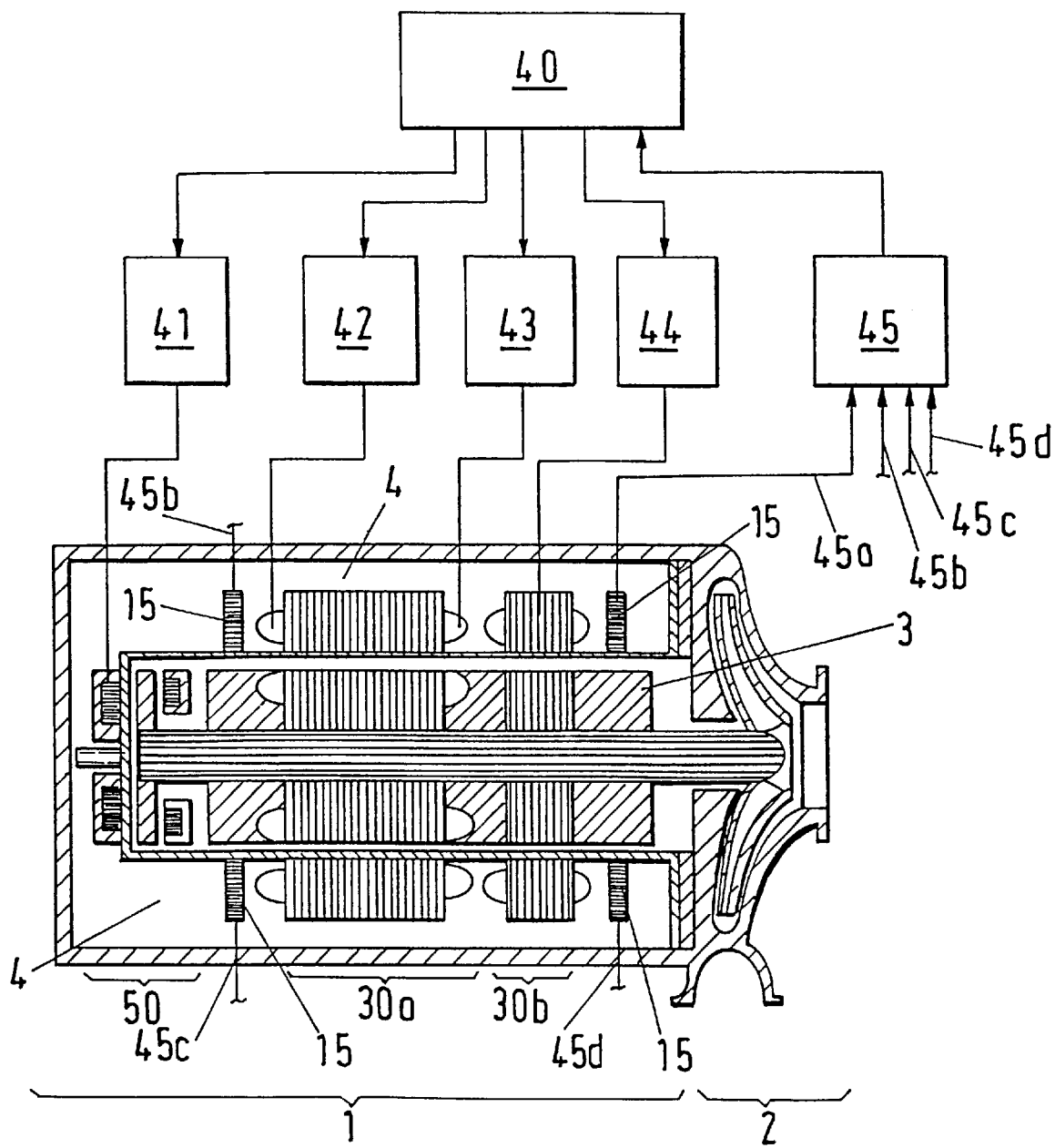
FIG. 9 is a gap tube motor with an excitation apparatus.

FIG. 9 shows an excitation apparatus in combination with a gap tube pump in accordance with the embodiment illustrated in FIG. 6. The position of the rotor 3 is measured with a plurality of sensors 15 and supplied to a signal processing apparatus 45 via electrical lines 45a, 45b, 45c, 45d which transmits the position of the rotor to a higher level control apparatus 40. This control or regulating apparatus 40, which usually comprises a computer, controls the axial bearing 50 via the converter 41, the two coils 12 and 12a of the bearing-free motor 30a via the converters 42 and 43, and the magnetic bearing 30b via the converter 44. The position of the rotor 3 can be controlled in the radial direction and in the axial direction by the illustrated control apparatus in such a manner that the rotor 3 is journalled without contact in the stator 4. In addition, the control apparatus 40 controls the bearing-free motor 30a, with which the rotor 3 is driven, via the two coils 12 and 12a.

The bearing and drive apparatus 32 can also be designed in such a manner that an electric motor 31 and a magnetic bearing apparatus 30b are combined in such a manner that both an effect supporting the rotor 3 and an effect driving the rotor 3 arise. For example, the magnetic bearing apparatus 30b can be arranged immediately adjacent to the electric motor 31. Suitable for a driving electric motor 31, for example, is a synchronous motor or a brushless DC motor with permanent magnetic excitation or with an excitation winding excited by a current. Likewise suitable is an induction motor or a reluctance motor.

What is claimed is:

1. A gap tube motor comprising a rotor, a stator and a gap tube which is arranged between the rotor and the stator wherein at least two bearing apparatuses are arranged with a spacing in the axial direction with respect to the rotor; and wherein at least one of the bearing apparatuses is designed as a bearing and drive apparatus and comprises both an electrical motor drive apparatus and a magnetic bearing apparatus in order to both drive a rotor and journal the rotor in the radial direction without contact through this bearing and drive apparatus; and wherein the bearing and drive apparatus is designed as a bearing-less motor with a motor winding having a number of pole pairs p arranged at the stator as well as a control winding having a number of pole pairs p±1.

2. A gap tube motor in accordance with claim 1 wherein the bearing and drive apparatus comprises an electric motor and a separately arranged magnetic bearing apparatus.

3. A gap tube motor in accordance with claim 1 wherein the rotor is designed as an inner rotor or as an outer rotor.

4. A gap tube motor in accordance with claim 1 wherein all bearing apparatuses are designed as magnetic bearing apparatuses for the contact-free journalling of the rotor in at least the radial direction.

5. A gap tube motor in accordance with claim 1 wherein at least one sensor is provided for the measurement of the position of the rotor; wherein a gap tube is arranged between the sensor and the rotor; and wherein the sensor is based on a magnetic measurement principle and, in particulars is designed as an eddy current sensor, an inductive sensor or a Hall sensor.

6. A gap tube motor in accordance with claim 1 wherein an actively magnetizable coil for influencing the axial position of the rotor is arranged in such a manner that the gap tube extends between the rotor and the coil.

7. A gap tube motor in accordance with claim 1 wherein the magnetic bearing apparatuses are fed by a three-phase rotary current controller.

8. A gap tube pump comprising a forwarding means for a fluid, in particular a centrifugal pump, as well as a gap tube motor in accordance with claim 1.

9. An apparatus comprising a gap tube motor in accordance with claim 8.

* * * * *